US010232849B2

(12) United States Patent
Liu et al.

(10) Patent No.: US 10,232,849 B2
(45) Date of Patent: Mar. 19, 2019

(54) COLLISION MITIGATION AND AVOIDANCE

(71) Applicant: Ford Global Technologies, LLC, Dearborn, MI (US)

(72) Inventors: Nanjun Liu, Ann Arbor, MI (US); Kun Deng, Ann Arbor, MI (US); Wangdong Luo, Auburn Hills, MI (US); Alex Maurice Miller, Canton, MI (US); Gerald H. Engelman, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 67 days.

(21) Appl. No.: 15/412,138

(22) Filed: Jan. 23, 2017

(65) Prior Publication Data
US 2018/0208186 A1 Jul. 26, 2018

(51) Int. Cl.
*B60W 10/04* (2006.01)
*B60W 10/18* (2012.01)
*B60W 10/20* (2006.01)
*B60W 30/09* (2012.01)

(52) U.S. Cl.
CPC ............ *B60W 30/09* (2013.01); *B60W 10/04* (2013.01); *B60W 10/18* (2013.01); *B60W 10/20* (2013.01); *B60W 2550/308* (2013.01); *B60W 2710/18* (2013.01); *B60W 2720/24* (2013.01)

(58) Field of Classification Search
None
See application file for complete search history.

(56) References Cited

U.S. PATENT DOCUMENTS

| 5,018,689 | A | * | 5/1991 | Yasunobu | ............... B60L 15/00 246/182 B |
|---|---|---|---|---|---|
| 7,893,819 | B2 | | 2/2011 | Pfeiffer et al. | |
| 8,762,043 | B2 | | 6/2014 | Eidehall et al. | |
| 8,862,383 | B2 | | 10/2014 | Tsuchida | |
| 2003/0139881 | A1 | | 7/2003 | Miller et al. | |
| 2004/0199327 | A1 | * | 10/2004 | Isogai | ............... B60K 31/0008 701/301 |
| 2008/0046145 | A1 | | 2/2008 | Weaver et al. | |
| 2008/0243389 | A1 | | 10/2008 | Inoue et al. | |
| 2009/0192710 | A1 | * | 7/2009 | Eidehall | ............ B62D 15/0265 701/301 |

(Continued)

FOREIGN PATENT DOCUMENTS

| CN | 105869438 A | 8/2016 |
|---|---|---|
| DE | 102013005404 A1 | 9/2013 |
| KR | 1020130078399 A | 7/2013 |

OTHER PUBLICATIONS

GB Search Report dated Jul. 13, 2018 re GB Appl. No. 1800995.1.

*Primary Examiner* — Rami Khatib
(74) *Attorney, Agent, or Firm* — Frank A. MacKenzie; Bejin Bieneman PLC

(57) ABSTRACT

A time to collision is determined between a turning host vehicle and each of a plurality of targets. Based on a lateral distance and a longitudinal distance, a minimum distance is determined between the turning host vehicle and each of the plurality of targets. A threat number is determined for each target selected based on the time to collision and the minimum distance. A vehicle component is actuated based on the threat number.

20 Claims, 5 Drawing Sheets

(56) References Cited

U.S. PATENT DOCUMENTS

| | | | |
|---|---|---|---|
| 2012/0314071 A1* | 12/2012 | Rosenbaum | B60W 30/0956 |
| | | | 348/148 |
| 2013/0024073 A1 | 1/2013 | Son | |
| 2013/0338877 A1 | 12/2013 | Strausb | |
| 2014/0032049 A1* | 1/2014 | Moshchuk | B62D 15/0265 |
| | | | 701/42 |
| 2014/0136044 A1* | 5/2014 | Conrad | G08G 1/166 |
| | | | 701/23 |
| 2014/0292554 A1* | 10/2014 | Smith | B60K 31/0008 |
| | | | 342/27 |
| 2015/0151725 A1* | 6/2015 | Clarke | B60W 30/00 |
| | | | 701/28 |
| 2017/0177953 A1* | 6/2017 | Stein | G06K 9/00798 |
| 2018/0118146 A1* | 5/2018 | Ito | B60R 21/0134 |
| 2018/0122243 A1* | 5/2018 | Prasad | B60T 7/22 |

\* cited by examiner

COLLISION MITIGATION AND AVOIDANCE

BACKGROUND

Vehicle collisions often occur at intersections. Collision mitigation between a host vehicle and a target may be difficult and expensive to implement. For example, determining a threat assessment for the target may require data from a plurality of sensors. Furthermore, performing the threat assessment for several targets can be costly, especially when certain targets may have a lower risk of a collision.

DETAILED DESCRIPTION

A computing device in a vehicle can be programmed to determine a time to collision between a host vehicle in a turn and each of a plurality of targets and a minimum distance between the host vehicle and at least one of the targets. The minimum distance is based at least in part on a lateral distance and a longitudinal distance of the host vehicle from the target. The computing device can determine a "threat number" for at least one of the targets, and can actuate one or more host vehicle components based at least in part on the threat number. One or more of the plurality of the targets may not require an extensive threat assessment, and the computing device is programmed to downselect, i.e., reduce the number of, the targets to perform the threat assessment. Specifically, the computing device is programmed to perform the threat assessment on targets having a time to collision below a time threshold and a minimum distance below a distance threshold. Thus, the computing device can reduce the number of threat assessments calculated and reduce the number of calculations for preventing and mitigating potential collisions between the vehicle and the targets.

Figure 1:
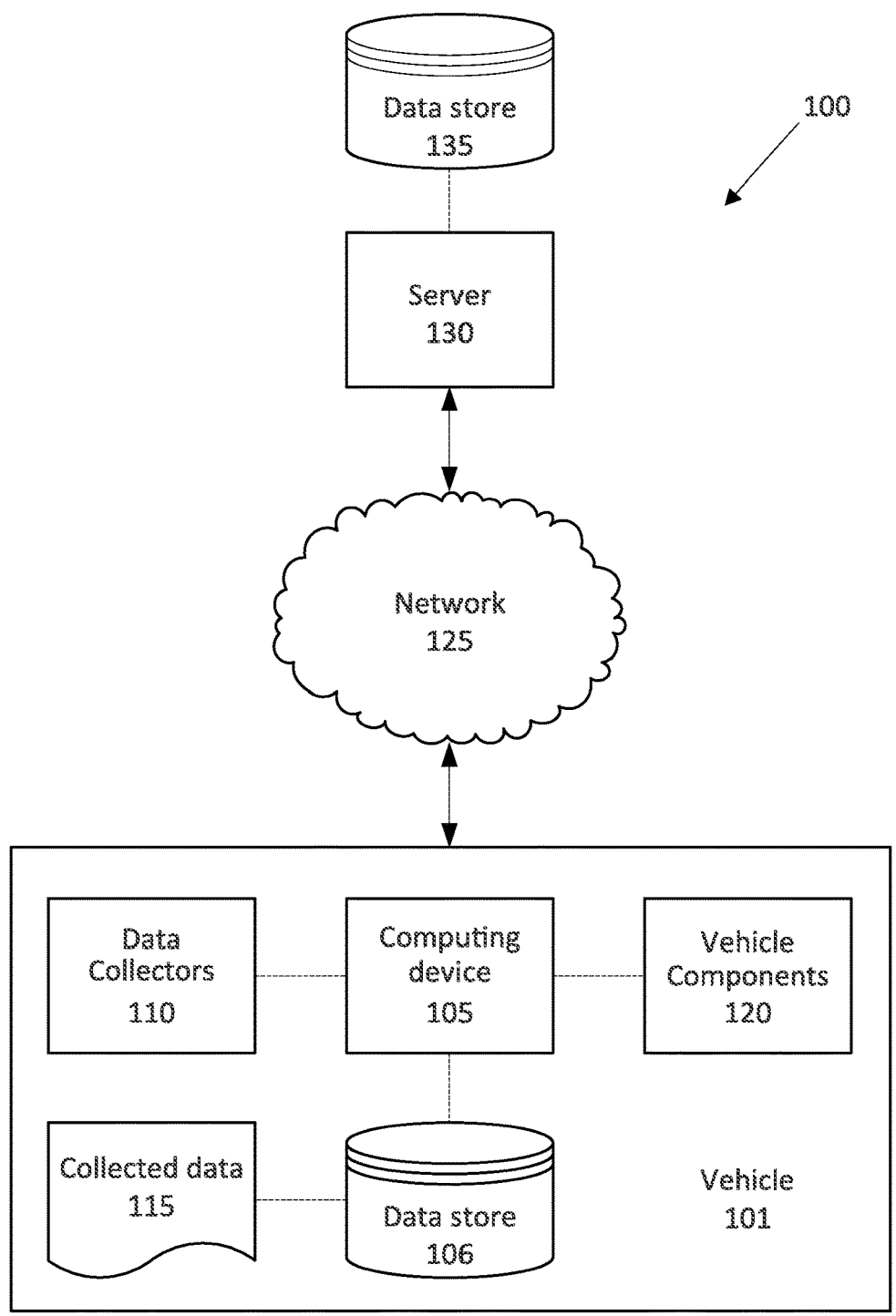
FIG. 1 is a block diagram of an example system for collision prevention and mitigation.

FIG. 1 illustrates a system 100 for collision prevention and mitigation. Unless indicated otherwise in this disclosure, an "intersection" is defined as a location where two or more vehicles' current or potential future trajectories cross. Thus, an intersection could be at any location on a surface where two or more vehicles could collide, e.g. a road, a driveway, a parking lot, an entrance to a public road, driving paths, etc. Accordingly, an intersection is determined by identifying a location where two or more vehicles may meet, i.e., collide. Such determination uses potential future trajectories of a host vehicle 101 as well as nearby other vehicles and/or other objects.

A computing device 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computing device 105 is generally programmed for communications on a vehicle 101 network, e.g., including a communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including sensors 110. Alternatively or additionally, in cases where the computing device 105 actually comprises multiple devices, the vehicle network may be used for communications between devices represented as the computing device 105 in this disclosure. In addition, the computing device 105 may be programmed for communicating with the network 125, which, as described below, may include various wired and/or wireless networking technologies, e.g., cellular, Bluetooth, wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computing device 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

The computing device 105 may actuate the components 120 to, e.g., brake and/or slow and/or stop the vehicle 101, to avoid targets, etc. The computing device 105 may be programmed to operate some or all of the components 120 with limited or no input from a human operator, i.e., the computing device 105 may be programmed to operate the components 120. When the computing device 105 operates the components 120, the computing device 105 can ignore input from the human operator with respect to components 120 selected for control by the computing device 105, which provides instructions, e.g., via a vehicle 101 communications bus and/or to electronic control units (ECUs) as are known, to actuate vehicle 101 components, e.g., to apply brakes, change a steering wheel angle, etc. For example, if the human operator attempts to turn a steering wheel during steering operation, the computing device 105 may ignore the movement of the steering wheel and steer the vehicle 101 according to its programming.

When the computing device 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computing device 105 and not a human operator. A semi-autonomous mode is one in which at least one of vehicle 101 propulsion (typically via a powertrain including an electric motor and/or internal combustion engine), braking, and steering are controlled at least partly by the computing device 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
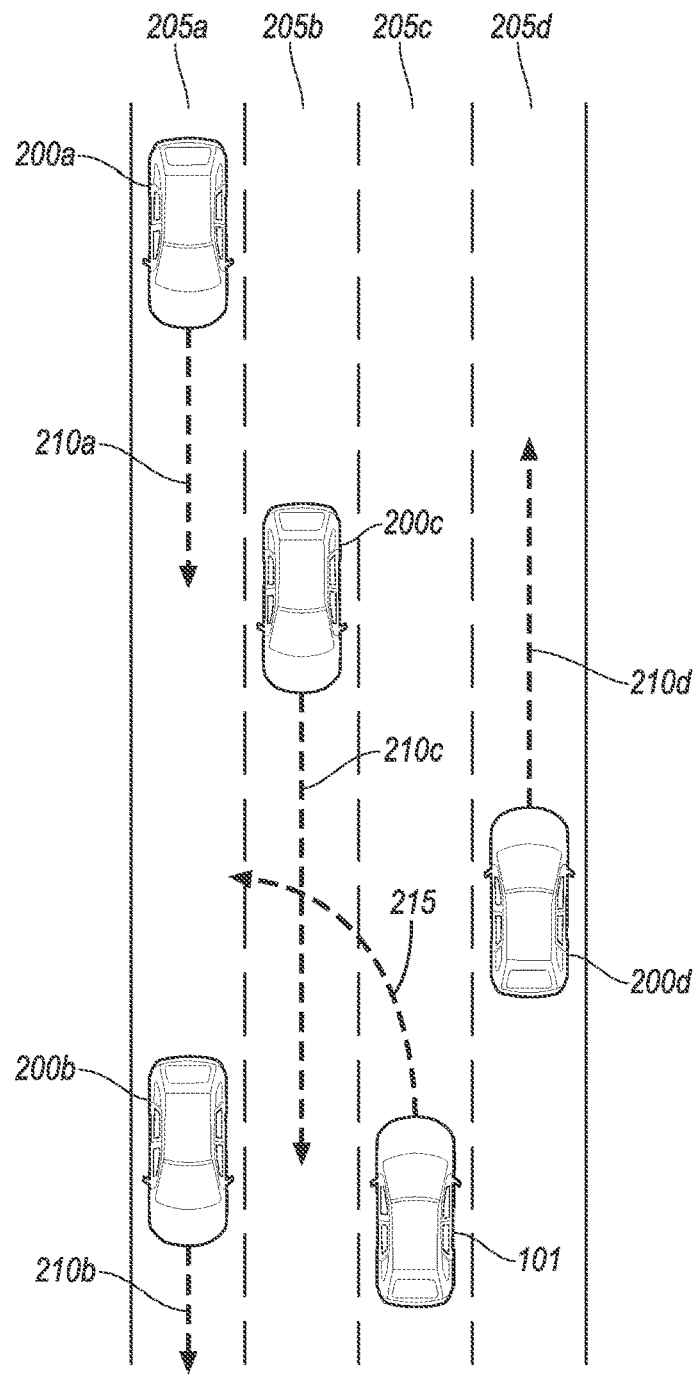
FIG. 2 illustrates an example intersection with a host vehicle and a plurality of targets.

FIG. 2 illustrates an example host vehicle 101 and a plurality of example targets 200 that can cross the path of the host vehicle 101 in an intersection on a roadway. The roadway includes a plurality of roadway lanes 205, including the roadway lanes 205a, 205b, 205c, 205d.

The sensors 110 in the host vehicle 101 can detect four targets 200a, 200b, 200c, 200d. Each of the targets 200a, 200b, 200c, 200d has a respective trajectory 210a, 210b, 210c, 210d and a differently likelihood of colliding with the host vehicle 101. The host vehicle 101 can perform a turn 215 across one or more roadway lanes 205. Thus, not all of the targets 200a, 200b, 200c, 200d warrant extensive threat estimation in the intersection. For example, the vehicle 200a is in the roadway lane 205a, which the host vehicle 101 will cross during the turn 215, so the computing device 105 can perform a threat assessment on the target 200a. In another example, the target 200d is in the roadway lane 205d, and does not cross the path of the host vehicle 101 in the turn 215. Thus, the computing device 105 should not perform a threat assessment on the target 200d. Similarly, the target 200b is in the roadway lane 200a, but has already cleared the path that the host vehicle 101 will travel in the turn 215, so the computing device 105 should not perform the threat assessment on the target 200b.

Figure 3:
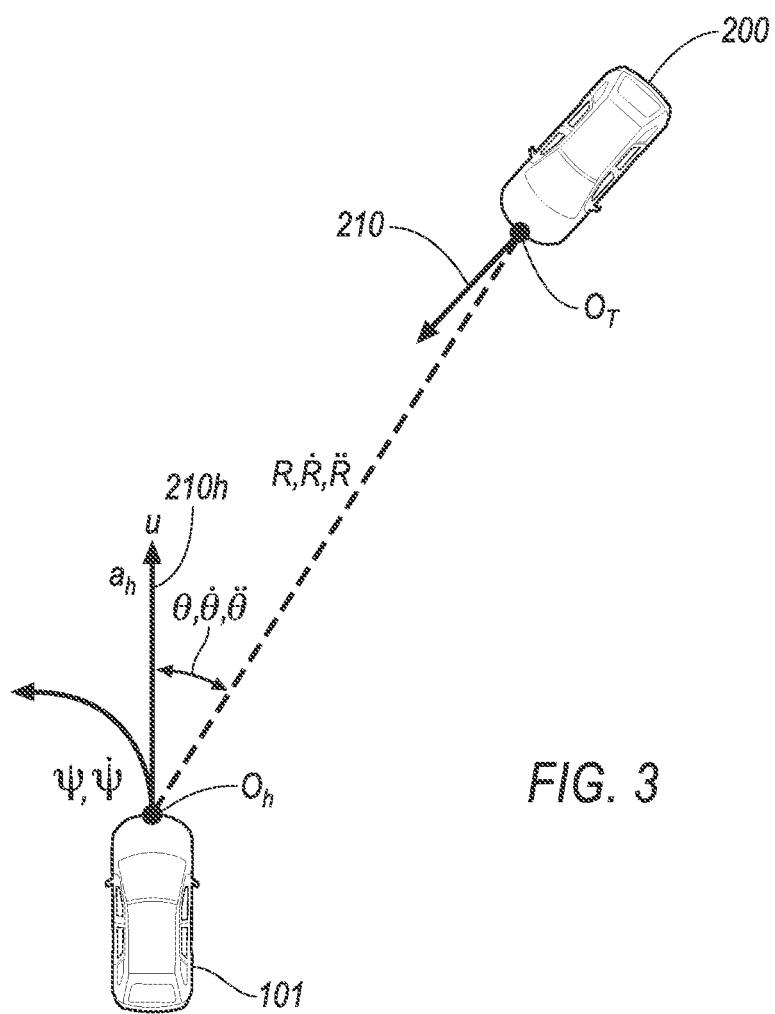
FIG. 3 is an example diagram of measurements taken by the host vehicle in polar coordinates between the host vehicle and the target.

FIG. 3 illustrates data 115 measured by the sensors 110 of the host vehicle 101 and one example target 200 as determined by the computing device 105 in polar coordinates. The target 200 has the trajectory 210, as described above. The host vehicle 101 has a trajectory 210h. The trajectories 210, 210h indicate where the host vehicle 101 and the target 200 would move if the host vehicle 101 and the target 200 continued at their respective velocities without turning. The host vehicle 101 can define a coordinate system with an origin $O_h$ at a center point of a front end of the host vehicle 101. The computing device 105 can use the origin $O_h$ to specify the position, speed, and/or acceleration of the host vehicle 101 and the target 200. One or more sensors 110 can natively collect data 115 in the polar coordinates.

A range R between the host vehicle 101 and the target 200 is defined as the shortest straight line between the origin $O_h$ of the host vehicle 101 and an origin $O_T$ of the target 200, measured in meters. A range rate $\bar{R}$ is a rate of change of the range (i.e., dR/dt) and range acceleration $\bar{\bar{R}}$ is a rate of change of the range rate (i.e., $d^2R/dt^2$). The range R is thus the shortest distance between the host vehicle 101 and the target 200. The range R can be determined by one of the sensors 110, e.g., a radar 110.

An azimuth θ is an angle defined between the trajectory 210h of the host vehicle 101 and a trajectory 210 of the target 200, measured in radians. The trajectory 210h of the host vehicle 101 and the trajectory 210 of the target 200 are projected as straight lines intersecting at the host vehicle 101. The angle defined by the directions of travel is the azimuth θ. An azimuth rate $\bar{\theta}$ is the rate of change of the azimuth θ (i.e., dθ/dt) and an azimuth acceleration $\ddot{\theta}$ is the rate of change of the azimuth rate $\bar{\theta}$ (i.e., $d^2\theta/dt^2$).

A heading angle ψ is an angle defined between the trajectory of the host vehicle 101 and a direction of a roadway lane 205, measured in radians. The heading angle ψ indicates whether the host vehicle 101 is in a turn 215 and/or will leave the current roadway lane 205. A heading angle ψ at a time $t_0$ is $ψ_0$.

When the host vehicle 101 is in a turn 215, the heading angle ψ of the host vehicle 101 changes. The change in ψ, i.e., a turn rate, is defined as a yaw rate $\bar{ψ}$, measured in radians per second. The yaw rate $\bar{ψ}$ can be used by the computing device 105 to determine whether the target 200 will collide with the host vehicle 101. That is, because the host vehicle 101 is turning away from the current direction of travel, the host vehicle 101 can avoid the target 200 even if, at a certain time, the direction of travel of the target 200 indicates a potential collision with the host vehicle 101.

A host velocity u is a speed of the host vehicle 101 along the trajectory 210h, measured in meters per second. A host acceleration $a_h$ is the rate of change of the host velocity u (i.e., du/dt).

Figure 4:
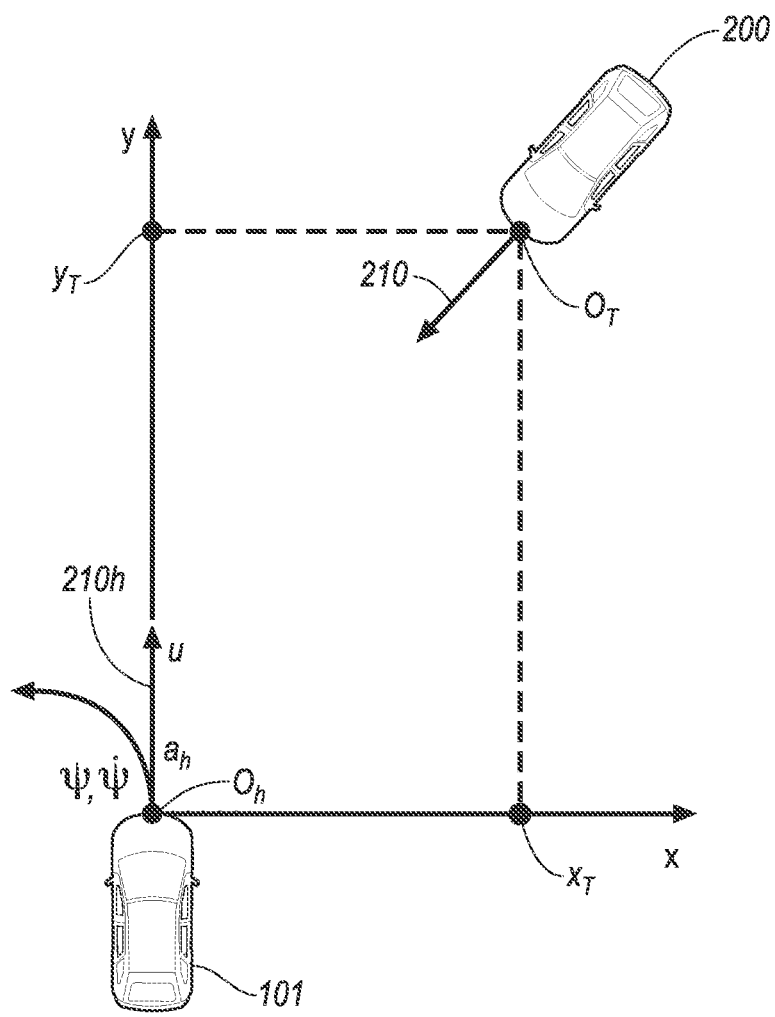
FIG. 4 is an example diagram of mapping the measurements of FIG. 3 into rectangular coordinates.

FIG. 4 illustrates the host vehicle 101 and the target 200 in the rectangular coordinates. The rectangular coordinates start at the origin of the host vehicle 101 and are specified according to orthogonal directions: a lateral direction, designated with the variable x, and a longitudinal direction, designated with the variable y. Rather than using the polar coordinates as in FIG. 3, the computing device 105 can predict the position, speed, and acceleration of the host vehicle 101 and the target vehicle in the rectangular coordinates. Specifically, the computing device 105 can determine a position, speed, and acceleration in a longitudinal direction and a position, speed, and acceleration in a lateral direction, as described below. Furthermore, one or more sensors 110 can collect data 115 in the polar coordinates, and the computing device 105 can convert the data 115 in polar coordinates to values in the rectangular coordinates.

A lateral position $x_T$ of the target 200 is a distance in the lateral direction of the target 200 relative to the host vehicle 101. A lateral velocity $v_{Tx}$ of the target 200 is a rate of change of the lateral position $x_T$, i.e., $dx_T/dt$. A lateral acceleration $a_{Tx}$ of the target 200 is a rate of change of the lateral velocity $v_{Tx}$, i.e., $dv_{Tx}/dt$. A lateral position of the host vehicle 101 at a time $t_0$ is $x_{H0}$ and a lateral position of the target 200 at a time $t_0$ is $x_{T0}$.

A longitudinal position $y_T$ of the target 200 is a distance in the longitudinal direction of the target 200 relative to the host vehicle 101. A longitudinal velocity $v_{Ty}$ of the target 200 is a rate of change of the longitudinal position $y_T$, i.e., $dv_{Ty}/dt$. A longitudinal acceleration $a_{Ty}$ of the target 200 is a rate of change of the longitudinal velocity $v_{Ty}$, i.e., $dv_{Ty}/dt$. A longitudinal position of the host vehicle 101 at a time $t_0$ is $y_{H0}$ and a longitudinal position of the target 200 at a time $t_0$ is $y_{T0}$.

The radar 110 can provide relative measurements of the distance between the host vehicle 101 and the target 200. For example, the radar 110 can measure a relative lateral distance $x_r$ and a relative longitudinal distance $y_r$ between the host vehicle 101 and the target 200. The radar 110 can determine a relative lateral velocity $\bar{x}_r$ and a relative longitudinal velocity $\bar{y}_r$ between the host vehicle 101 and the target 200. The radar 110 can determine a relative lateral acceleration $\ddot{x}_r$ and a relative longitudinal acceleration $\ddot{y}_r$ between the host vehicle 101 and the target 200. As described below, the computing device 105 can use the measure relative values $x_r$, $y_r$, $\bar{x}_r$, $\bar{y}_r$, $\ddot{x}_r$, $\ddot{y}_r$, to determine predicted values in the coordinate system, e.g., $x_T$, $v_{Ty}$, etc.

The values described above can be functions of time t, measured in seconds. When the computing device 105 begins collecting data 115, the computing device 105 assigns the time t as $t_0$. The computing device 105 can predict the path of the host vehicle 101 and the target 200 over a predetermined time horizon $t_h$. For the purposes of the following equations, a value at a given time t can be defined as that value at a time $t_0$ added to the change in the value from $t_0$ to t. For example, the representation x(t) defines the lateral position $x(t_0)+x(t-t_0)$. Values of values at $t_0$ can be measured by the sensors 110 and values for $t>t_0$ are calculated with the equations listed below.

The motion of the host vehicle 101 can be described as:

$$TTC(t) = \frac{R(t)}{\dot{R}(t)} \tag{1}$$

$$x_H(t) = \frac{u}{\dot{\psi}}[\sin(\dot{\psi}t + \psi_0) - \sin\psi_0] + x_{H0} \tag{2}$$

$$y_H(t) = \frac{u}{\dot{\psi}}[\cos\psi_0 - \cos(\dot{\psi}t + \psi_0)] + y_{H0} \tag{3}$$

where $x_H(t)$, $y_H(t)$ are the host vehicle 101 position at time $t+t_0$ in the rectangular coordinates described above.

When the target 200 is moving in a straight line:

$$x_T(t) = \frac{1}{2}a_{Tx}t^2 + v_{Tx}t + x_{T0} \tag{4}$$

$$y_T(t) = \frac{1}{2}a_{Ty}t^2 + v_{Ty}t + y_{T0} \tag{5}$$

where $x_T(t)$, $y_T(t)$ are the target 200 position at time $t_0+t$ in the rectangular coordinates.

The distance between the host vehicle 101 and the target 200 in the x direction, dx(t), and the y direction, dy(t), can be defined as:

$$dx(t) = \tag{6}$$
$$x_T(t) - x_H(t) = \frac{1}{2}a_{Tx}t^2 + v_{Tx}t + x_{T0} - \frac{u}{\dot{\psi}}[\sin(\dot{\psi}t + \psi_0) - \sin\psi_0] - x_{H0}$$

$$dy(t) = \tag{7}$$
$$y_T(t) - y_H(t) = \frac{1}{2}a_{Ty}t^2 + v_{Ty}t + y_{T0} - \frac{u}{\dot{\psi}}[\cos\psi_0 - \cos(\dot{\psi}t + \psi_0)] - y_{H0}$$

Based on the above equations, the lateral distance dLat(t) and the longitudinal distance dLong(t) can be determined:

$$dLat(t) = dx(t)\sin\psi_0 - dy(t)\cos\psi_0 = \tag{8}$$
$$\frac{1}{2}a_{T\_lat}t^2 + v_{T\_lat}t + x_{T\_lat} + \frac{u}{\dot{\psi}}[1 - \cos(\dot{\psi}t)]$$

$$dLon(t) = \tag{9}$$
$$dx(t)\cos\psi_0 + dy(t)\sin\psi_0 = \frac{1}{2}a_{T\_lon}t^2 + v_{T\_lon}t + x_{T\_lon} + \frac{u}{\dot{\psi}}[\sin(\dot{\psi}t)]$$

where the lateral and longitudinal information is directly provided by one of the sensors 110, and are defined as $$a_{T\_lat} = a_{Tx}\sin\psi_0 - a_{Ty}\cos\psi_0$$

$$a_{T\_lon} = a_{Tx}\cos\psi_0 + a_{Ty}\sin\psi_0$$

$$v_{T\_lat} = v_{Tx}\sin\psi_0 - v_{Ty}\cos\psi_0$$

$$v_{T\_lon} = v_{Tx}\cos\psi_0 + v_{Ty}\sin\psi_0$$

$$x_{T\_lat} = (x_{T0}-x_{H0})\sin\psi_0 - (y_{T0}-y_{H0})\cos\psi_0$$

$$y_{T\_lon} = (x_{T0}-x_{H0})\cos\psi_0 + (y_{T0}-y_{H0})\sin\psi_0 \tag{10}$$

At time $t+t_0$, the projected distance between the host vehicle 101 and the target 200 can be expressed, using the values determined in Equations 6-9 above, as $$d(t) = \sqrt{dx(t)^2 + dy(t)^2} = \sqrt{dLat(t)^2 + dLon(t)^2} \tag{11}$$

For a time period of $t_h$ seconds, the computing device 105 can determine the projected distance d(t) over the time period of $[t_0, t_0+t_h]$. The computing device 105 can determine the minimum distance between the host vehicle 101 and the target 200 during the time window $[t_0, t_0+t_h]$, i.e., $d_{min}(t)=\min(d(t)|t \in [0, t_h])$. When $TTC(t)<TTC_{thresh}$ and $d_{min}(t)<d_{min\ thresh}$, the target 200 is selected for further threat assessment; otherwise, the target 200 is not selected.

The relationship between the radar data 115 and other sensor data 115 can be described as $$x_r = x_T$$

$$y_r = y_T$$

$$\bar{x}_r = v_{T\_lat} + y_{T\_lon}\bar{\dot{\psi}}$$

$$\bar{y}_r = v_{T\_lon} - x_{T\_lat}\bar{\dot{\psi}}$$

$$\ddot{x}_r = a_{T\_lat} + v_{T\_lon}\bar{\dot{\psi}} + \bar{y}_r\bar{\dot{\psi}} + y_{T\_lon}\bar{\ddot{\psi}}$$

$$\ddot{y}_r = a_{T\_lon} + v_{T\_lat}\bar{\dot{\psi}} - \bar{x}_r\bar{\dot{\psi}} - x_{T\_lon}\bar{\ddot{\psi}} \tag{12}$$

The computing device 105 can perform the threat assessment on the targets 200 and generate a threat number for each of the targets 200. A threat number is a prediction of whether a specific target 200 will intersect or collide with the host vehicle 101. Specifically, the computing device 105 may determine the acceleration threat number ATN, the brake threat number BTN, and the steering threat number STN for the host vehicle 101 and the target 200, and based on the threat numbers ATN, BTN, STN, which may be combined into a single threat number TN, actuate components 120.

The BTN is a measure of a change in longitudinal acceleration to allow one of the host vehicle 101 to stop or the target 200 to pass the host vehicle 101. The STN is a measure of a change in lateral acceleration to allow one of the host vehicle 101 and the target 200 to clear a crossing zone. The ATN is a measure of a specific longitudinal acceleration to allow one of the host vehicle 101 and the target 200 to pass the other of the host vehicle 101 and the target 200. That is, the BTN is a measure of longitudinal acceleration of the host vehicle 101, and may be determined with data 115 from the sensors 110. The STN is a measure of lateral acceleration of the host vehicle 101. The ATN is a measure of throttle changes. The computing device 105 may determine the STN, BTN, and/or ATN to for each of the targets 200 to produce the threat number.

The computing device 105 can determine the threat number based on the predicted trajectories of the host vehicle 101 and the target 200. That is, based on the position, velocity, acceleration, and turn rate of the host vehicle 101 and the target 200, the computing device 105 can determine the threat number for the target 200. The computing device 105 can use the values determined above in Equations 1-12 to determine the threat number. In one non-limiting example, the BTN, STN, and ATN can be determined in a manner, including according to equations, described in U.S. patent application Ser. No. 15/005,037, Pub. No. 2016/0362104, filed Jan. 25, 2016, which is incorporated herein by reference in its entirety. Other techniques for determining threat numbers could alternatively be used, e.g., such as are known or developed.

The computing device 105 can actuate one or more vehicle components 120 based on the threat number, e.g., when the threat number is above a predetermined threat number threshold. The computing device 105 can actuate the components 120 based on a comparison of the threat number to a plurality of thresholds. For example, if the threat number is above 0.7, the computing device 105 can actuate a brake 120 to decelerate the host vehicle 101, e.g., to −6.5 meters per second squared (m/s$^2$). In another example, if the threat number is above 0.4 but less than or equal to 0.7, the computing device 105 can actuate the brake 120 to, e.g., a deceleration of −2.0 m/s$^2$. In another example, if the threat number is greater than 0.2 but less than or equal to 0.4, the computing device 105 can display a visual warning on a vehicle 101 HMI and/or play an audio warning over a speaker.

Figure 5:
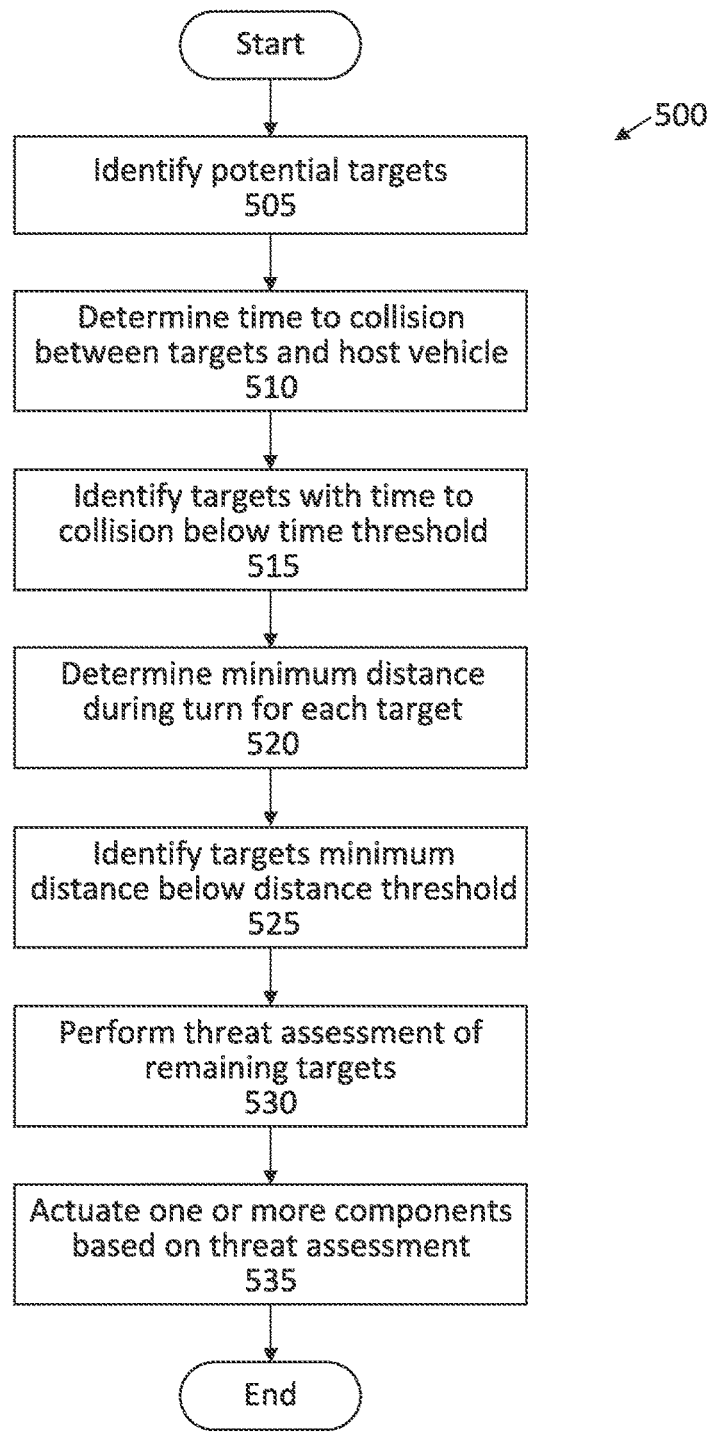
FIG. 5 is a block diagram of an example process for avoiding collisions between the host vehicle and the target.

FIG. 5 illustrates an example process 500 for avoiding a collision in an intersection. The process 500 begins in a block 505, in which the computing device 105 actuates one or more sensors 110 to identify targets 200. As discussed above with respect to FIG. 2, the computing device 105 an identify a plurality of targets 200, and some of the targets 200 may not require a threat assessment.

Next, in a block 510, the computing device 105 determines a time to collision TTC for each of the targets 200 and the host vehicle 101. As described above, the time to collision TTC is based on the range R and the range rate $\overline{R}$ of the target 200 relative to the host vehicle 101. The time to collision TTC determines whether to consider a specific target 200 for a threat assessment.

Next, in a block 515, the computing device 105 identifies the targets 200 having the respective time to collision TTC below a time threshold TTC$_{thresh}$. As described above, if the time to collision TTC is above the time threshold TTC$_{thresh}$, then the target 200 is not likely to collide with the host vehicle 101, and the computing device 105 does not need to perform a threat assessment on that target 200.

Next, in a block 520, the computing device 105 determines the minimum distance d(t) between the host vehicle 101 and each remaining target 200. The minimum distance d(t) is based at least in part on the yaw rate $\overline{\psi}$ of the host vehicle 101 and the lateral position $x_T$ and the longitudinal position $y_T$ of the target 200.

Next, in a block 525, the computing device 105 identifies the targets 200 that have a minimum distance d(t) below a distance threshold d$_{min\ thresh}$. As described above, targets 200 that have a minimum distance d(t) above the distance threshold d$_{min\ thresh}$ can have a lower likelihood of colliding with the host vehicle 101, and thus the computing device 105 may not perform a threat assessment for those targets 200.

Next, in a block 530, the computing device 105 performs a threat assessment to determine a threat number for each of the remaining targets 200. That is, the targets 200 that have a time to collision TTC and a minimum distance d(t) below their respective thresholds have a higher probability of colliding with the host vehicle 101. Thus, the computing device 105 selects the subset of targets 200 that have the highest likelihood of colliding with the host vehicle 101 to perform the threat assessment.

Next, in a block 535, the computing device 105 actuates one or more components 120 based on the threat assessment. For example, if the threat number is above 0.7, the computing device 105 can actuate a brake to decelerate the host vehicle 101, e.g., to −6.5 meters per second squared (m/s$^2$). In another example, if the threat number is above 0.4 but less than or equal to 0.7, the computing device 105 can actuate the brake to, e.g., a deceleration of −2.0 m/s$^2$. In another example, if the threat number is greater than 0.2 but less than or equal to 0.4, the computing device 105 can display a visual warning on a vehicle 101 HMI and/or play an audio warning over a speaker. Following the block 535, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein.

Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising a computer including a processor and a memory, the memory storing instructions executable by the processor to:
   determine a time to collision and, based on a lateral distance and a longitudinal distance, a minimum distance between a turning host vehicle and each of a plurality of targets;
   then select a target from the plurality of targets based on the time to collision and the minimum distance;
   determine a threat number for the selected target; and
   actuate a vehicle component based on the threat number.

2. The system of claim 1, wherein the instructions further include instructions to actuate the vehicle component when the threat number is above a threat number threshold.

3. The system of claim 1, wherein the minimum distance is based at least in part on a turn rate of the host vehicle.

4. The system of claim 1, wherein the minimum distance is based at least in part on a lateral velocity of the target and a longitudinal velocity of the target.

5. The system of claim 1, wherein the minimum distance is based at least in part on a lateral acceleration of the target and a longitudinal acceleration of the target.

6. The system of claim 1, wherein the instructions further include instructions to determine the minimum distance for each of the plurality of targets based at least in part on a predicted distance between the host vehicle and the respective target over a predetermined time period.

7. The system of claim 1, wherein the instructions further include instructions to select the target from the plurality of targets when the minimum distance between the target and the host vehicle is below a distance threshold and the time to collision is below a time threshold.

8. The system of claim 1, wherein the instructions further include instructions to determine the minimum distance for each of the plurality of targets when the time to collision is below a time threshold.

9. The system of claim 8, wherein the instructions further include instructions to select the target from the plurality of targets when the minimum distance is below a distance threshold.

10. The system of claim 9, wherein the instructions further include instructions to actuate the vehicle component when the threat number is above a threat number threshold.

11. A method, comprising:
    determining a time to collision and, based on a lateral distance and a longitudinal distance, a minimum distance between a turning host vehicle and each of a plurality of targets;
    then selecting a target from the plurality of targets based on the time to collision and the minimum distance;
    determining a threat number for the selected target; and
    actuating a vehicle component based on the threat number.

12. The method of claim 11, further comprising actuating the vehicle component when the threat number is above a threat number threshold.

13. The method of claim 11, wherein the minimum distance is based at least in part on a turn rate of the host vehicle.

14. The method of claim 11, wherein the minimum distance is based at least in part on a lateral velocity of the target and a longitudinal velocity of the target.

15. The method of claim 11, wherein the minimum distance is based at least in part on a lateral acceleration of the target and a longitudinal acceleration of the target.

16. The method of claim 11, further comprising determining the minimum distance for each of the plurality of targets based on a predicted distance between the host vehicle and the respective target over a predetermined time period.

17. The method of claim 11, further comprising selecting the target from the plurality of targets when the minimum distance between the target and the host vehicle is below a distance threshold and the time to collision is below a time threshold.

18. The method of claim 11, further comprising determining the minimum distance for each of the plurality of targets when the time to collision is below a time threshold.

19. The method of claim 18, further comprising selecting the target from the plurality of targets when the minimum distance below a distance threshold.

20. The method of claim 19, further comprising actuating the vehicle component when the threat number is above a threat number threshold.

* * * * *